Figure 1:
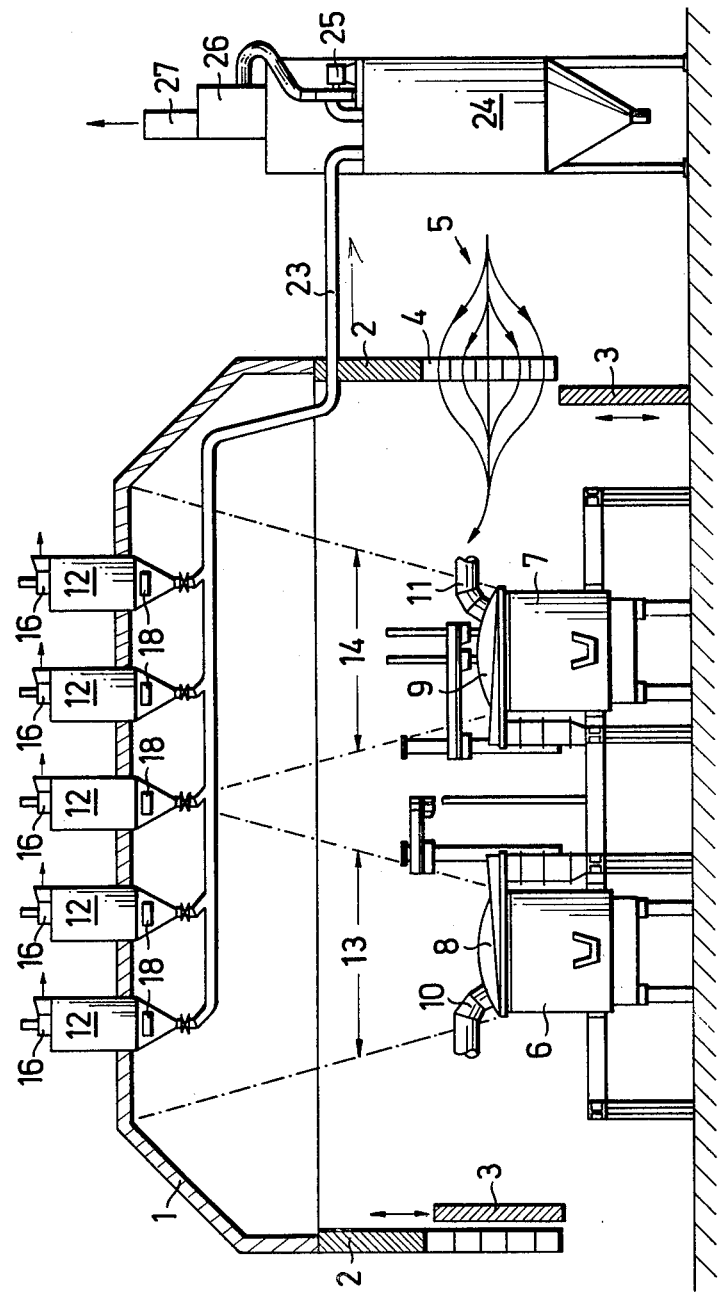

United States Patent [19]

Baum et al.

[11] Patent Number: 4,460,389
[45] Date of Patent: Jul. 17, 1984

[54] DEVICE FOR FILTERING DUST EXTRACTED FROM FACTORY BUILDINGS

[75] Inventors: Jörg P. Baum; Theodor Schäffer, both of Essen, Fed. Rep. of Germany

[73] Assignee: Verfahrenstechnik Dr.Ing.Kurt Baum

[21] Appl. No.: 123,398

[22] Filed: Feb. 21, 1980

Related U.S. Application Data

[63] Continuation of Ser. No. 917,657, Jun. 21, 1978, abandoned.

[30] Foreign Application Priority Data

Jul. 9, 1977 [DE] Fed. Rep. of Germany ....... 2731066

[51] Int. Cl.³ .......................... B01D 46/04; C21B 7/22
[52] U.S. Cl. ......................................... 55/273; 55/283;
55/287; 55/350; 55/385 A; 55/385 D; 55/431;
55/344; 266/80; 266/157; 266/158; 373/8;
98/115 R
[58] Field of Search ...................... 55/273, 300, 341 R,
55/350, 419, 467, 286, 287, 385 A, 385 D, 470,
431, 344, 283; 98/115 R; 266/142, 144, 158,
157, 80; 373/8

[56] References Cited

U.S. PATENT DOCUMENTS

| | | | |
|---|---|---|---|
| 1,240,305 | 9/1917 | Brooks et al. | 55/273 |
| 1,455,116 | 5/1923 | Lumley | 55/350 |
| 1,928,670 | 10/1933 | McCrery | 55/300 |
| 2,451,755 | 10/1948 | Lee | 55/428 |
| 2,902,113 | 9/1959 | Lühr | 55/273 |
| 2,997,132 | 8/1961 | Allander et al. | 98/115 R |
| 3,509,911 | 5/1970 | Carsey | 55/419 |
| 3,901,671 | 8/1975 | Kitami | 55/341 NT |

FOREIGN PATENT DOCUMENTS

| | | | |
|---|---|---|---|
| 301307 | 11/1954 | Switzerland | 55/273 |
| 981806 | 1/1965 | United Kingdom | 55/341 IO |

Primary Examiner—David L. Lacey
Attorney, Agent, or Firm—Toren, McGeady and Stanger

[57] ABSTRACT

A device for filtering dust from air drawn by apparatus from a factory shop or building, for example a steelmaking shop, including a plurality of dust extractors which have a total capacity at least equal to the air throughput of the drawn air. The extractors have regulators by which they can be regulated individually or in groups. Preferably each extractor is associated with an individual dust extractor and also each extractor preferably has its own individual cleaning system. The extractors are preferably of the dry filter bag type.

6 Claims, 4 Drawing Figures

DEVICE FOR FILTERING DUST EXTRACTED FROM FACTORY BUILDINGS

This is a continuation of application Ser. No. 917,657 filed on June 21, 1978, abandoned.

This invention relates to a device for the filtering extraction of dust from factory buildings, especially steelmaking shops, by means of an induced draft.

In the extracting of dust from factory buildings, difficulties arise particularly from the need to allow for dust sources which vary widely in their type and location. A distinction is therefore made in practice between direct or primary dust extraction and secondary dust extraction. Primary dust extraction picks up the dust directly at the place where it originates, whereas secondary dust extraction in general involves room or space extraction. Primary dust extraction therefore usually takes in smaller quantities of gas with a higher concentration of dust, for example the waste gases produced at an electric arc furnace or converter during charging, refining, tapping and casting, whereas the secondary dust extraction must be capable of coping with larger quantities of waste gas or air with a relatively low dust concentration, which in particular may often vary. The capital and operating costs for secondary dust extraction are correspondingly high. This has become of particular significance recently, in view of the more exacting enviromental protection regulations, which usually render secondary dust extraction necessary.

In order to avoid the high plant capital and operating costs involved in a secondary dust extraction, great efforts have been made in the past to improve the primary dust extraction, the objective of these efforts being to keep the dust content of the air in the workshop or hall as low as possible by intensifying and improving the primary dust extraction.

A proposal known from published West German Patent Specification (Offenlengungsschrift) No. 2,239,578 is aimed in this direction, the proposal being to arrange a water-cooled extract hood with a mounting ring in the nose region of a bottom-blown converter. The purpose of the mounting ring is to keep the unavoidable annular gap at the converter nose as small as possible. Although the use of an extract hood of this type results in a reduced dust content of the air in the steelmaking shop, on account of the improved removal of the primary waste gas, a secondary dust extraction stage cannot be avoided, since a hood of this type cannot be employed in all cases and also leakage losses cannot be eliminated. This is true especially for the charging of the converter, for sampling and for drawing off slag and emptying the converter. In addition, in a steelmaking shop there are other emitters, such as hot metal mixers and casting pits and also the working area for refractory lining and heating of the steel ladles. The secondary waste gases issuing from the emitters do indeed in general produce smaller dust loadings than that produced by the actual operation of the converter. In total, however, there is a dust content in the air in the shop which, in view of the increasingly stringent environmental protection regulations, makes a secondary dust removal necessary.

A further direct or primary dust extraction system is known from published West German Patent Specification (Offenlegungsschrift) No. 2,135,839 for an electric arc furnace; this extraction system includes both the furnace with the cover in place and when being charged with scrap by means of a charging basket, and also the steel ladle used when the furnace is discharged. In all three cases, the dust-containing gas is extracted by piping directly from the place where it originates.

In order to prevent loading of the steelmaking shop air with dust from the converter region, it is known from published West German Patent Specification (Offenlegungsschrift) No. 2,155,537 that a partition wall may be arranged extending from the roof at least down to the converter platform between the converters and the remaining part of the shop. This is, however, an extremely expensive and cumbersome procedure, which moreover makes communication between the two parts of the shop difficult and in particular does not take account of the fact that all regions of the shop must be accessible to at least one crane. Particular difficulties arise especially in the handling of materials to and from the converter. An added fact is that a partition wall of this type does not have any effect upon the dust loading arising from the other emitters.

A shop dust extraction system is also known, in which the principal emitters are subjected to direct extraction and in addition the shop air is extracted and subjected to dust extraction in order to deal with the secondary waste gases. In this manner, it is indeed possible for the environmental protection regulations to be satisfied. The dust extraction from the shop air does, however, require very powerful dust extraction units in view of the quantities of air to be treated, and thus necessitates correspondingly high capital and operating costs. A dust extraction plant of this type must be designed for the maximum air throughput and therefore requires a very large amount of space, very large filter surfaces and high energy consumption. Part load operation is not possible with such units, so that a correspondingly more expensive electrical installation is necessary. An additional factor is that dust extracters of this type due to their large dimensions and weight, cannot be used everywhere and in particular frequently cannot be located in the optimum position, so that long pipe runs and correspondingly high pressure losses must be accepted. Furthermore, dust extraction from the shop air must cease during maintenance or repair, and in particular also temporarily while the filter surfaces are being cleaned, on account of the shut-down necessary for this purpose.

The task underlying the present invention is to overcome the aforementioned disadvantages of the conventional dust extraction systems and in particular to create a dust extraction apparatus which shall ensure extremely effective dust extraction from the shop air in a manner capable of flexible operation and in combination with relatively low capital and operating costs. The dust extraction shall, in particular, comprise also the secondary waste gases, without a dust extraction unit designed for the maximum waste air discharge being necessary for this purpose.

The solution to this task consists in a device of the category initially mentioned, which consists according to the present invention of a plurality of dust extraction units, designed in total for the maximum air throughput and regulated individually and/or in groups. The individual dust extraction units constitute, in the device according to this invention, a mosaic-like integrated system, which in its output is equal to a conventional dust extraction unit, but which does not by any means give rise to such high capital and operating costs.

Thus, the use of numerous individual blowers instead of a single blower designed for the maximum waste air throughput permits the use of axial blowers, which are considerably less expensive than radial blowers in view of the reduced pressure loss. In addition, the power demand of about 50 kW per individual dust extraction unit requires a smaller voltage and thus also a simpler electrical installation.

An additional feature is the reduced weight and space demand of the individual dust extracters, which can be accommodated anywhere in more or less large groups. Thus, for example, all the individual dust extracters may be mounted on a shop roof, the load-bearing capacity of which would not permit the installation of an equivalent large extracter. The use of numerous small individual units of plant, which can of course be arranged alongside one another, inevitably produces a smaller static loading of the shop roof. An additional factor is that the suction range of a large number of dust extraction units disposed alongside one another is much larger than the suction range of a single equivalent large dust extraction plant, which normally neccessitates the use of an extract hood which results in an additional static loading. On the other hand, it is also possible to arrange the individual dust extraction units in groups associated with the individual emitters, and thus in particular to install them in the vicinity of the associated emitters. Accordingly, the dust extraction units can be mounted individually or in groups on the shop roof, on the walls of the shop and also moreover on the shop floor. This is in particular a great advantage when equipping already existing production shops, in which usually there is not sufficient space for the installation of a single, high capacity dust extraction plant.

A particular advantage in the dust extract device according to the present invention is the low pressure loss, which, for example, is at most 20 mbar per individual extract unit. Moreover, each dust extract unit can possess its own cleaning system, so that the necessary extraction of dust from the air can be maintained if, for example, one extract unit after the other is cleaned, maintained or repaired. The dust extraction performance or rating is then reduced during cleaning, repair and maintenance only by a fraction of the total number of dust extract units, because only one extract unit needs to be shut down at one time. This can be compensated, however, by increasing the power of individual extract units or by adding one extract unit. Moreover, the necessary work on the individual dust extract units can be carried out while the integrated system is not fully loaded.

In addition, a further advantage is the increased working life of the lower-rated individual dust extract units. Moreover, one large dust extract unit is more expensive than the individual extract units with the same total output.

Figure 2:
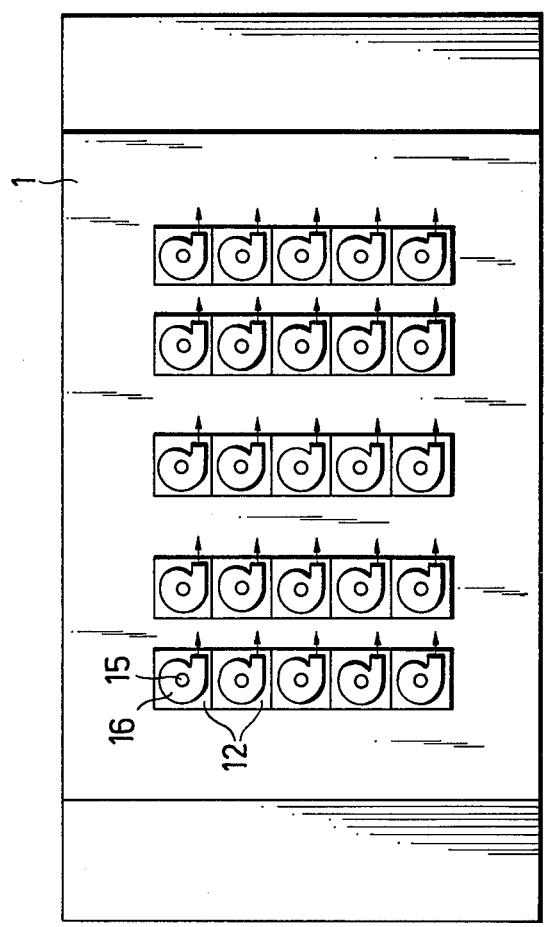
Figure 3:
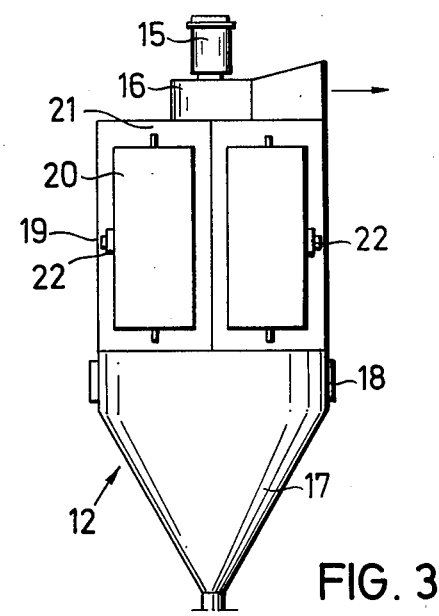
Figure 4:
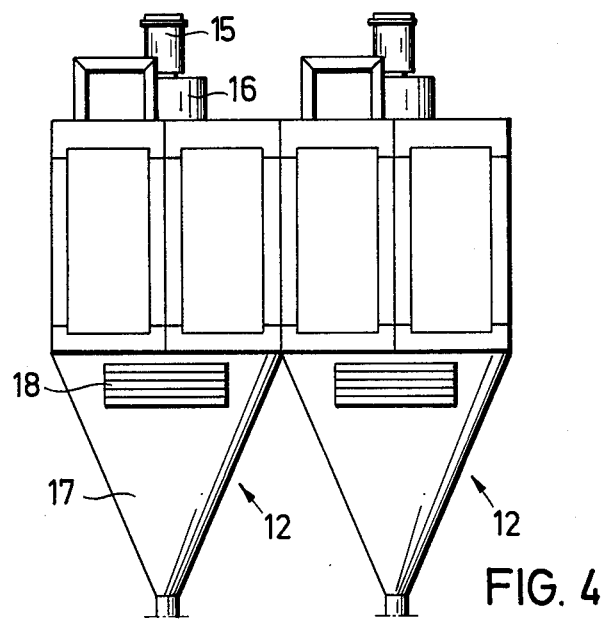

The invention is explained in more detail below with reference to an example of embodiment thereof illustrated in the drawing. The drawing shows:

FIG. 1 a closed steelmaking shop with a dust extraction device according to this invention, in section, FIG. 2 a plan of the dust extraction device of FIG. 1, FIG. 3 an axial longitudinal section through one of the dust extraction units of FIG. 1 and FIG. 4 a lateral view of two adjacent, individual dust extraction units.

A closed steelmaking shop consists of a roof hood 1 and lateral walls 2 comprising doors 3 and a ventilating opening 4 for a fresh air stream 5. In the steelmaking hall, there are situated two electric arc furnaces 6, 7, the covers 8, 9 of which are connected by suction lines 10, 11 to a common direct dust extracter, not shown here.

Above the two electric arc furnaces 6, 7, a total of twenty-five individual dust extracters 12 is distributed practically over the entire roof of the shop. These individual dust extracters thus cover not only the free jets 13, 14 of the two electric furnaces 6, 7, but in addition also the entire area of all other dust emitters in the shop. In this manner, it is ensured that the totality of the individual dust extracters 12 copes with all the dust emitters; the dust extracters possess moreover, a much larger intake range than that of one large dust extracter designed for the same maximum waste air throughput. Consequently, even when charging the furnaces with scrap, tapping and casting, an improved extraction of dust from the air is obtained overall than in the case of one single large dust extracter.

The individual dust extracters 12 are each equipped with a radial blower 16 driven by a motor 15, and consists basically of a dust collector 17 with suction openings 18 for entry of the air from the shop to be purified and of a filter housing 19 with conventional bag filters 20. The shop air passing through the intake openings 18 passes through the bag filters 20 into a clean gas collecting chamber 21 and thence through the blower 16 and is discharged purified to the atmosphere. Each individual dust extracter comprises vibrators 22 for cleaning the filter surfaces.

The dust collectors 17 of all the dust extracters 12 are connected by a common piping network 23 to a dust bunker 24 comprising a suction blower 25 for the transportation of dust and a filter 26 with an outlet 27 for the carrier air.

The individual dust extracters are cleaned one after another by switching on the vibrators in accordance with a predetermined time programme, so that only one dust extracter is out of operation at one time. In a similar manner, during maintenance and repair, it is only necessary for one single dust extracter to be switched off. The number of extracters required in operation at one time will depend upon the particular dust loading from the individual emitters. The number of dust extracters necessary for this purpose can be automatically switched on and off again, for example, by means of a dust monitor and/or smoke monitor. In this way, the total electrical consumption for dust extraction is always appropriate to the quantity of dust produced, whereas in the conventional dust extraction for a shop using one single large extracter, the maximum current consumption always occurs. The invention consequently relates to an integrated system of individual dust extracters, which operates in an extraordinarily flexible, efficient and economical manner.

We claim:

1. Apparatus for the extraction of dust from dust-laden air in an industrial building containing a plurality of dust emitters, said building defining a finite space in which the dust-laden air to be drawn by said apparatus is contained with the total capacity of said apparatus being determined in accordance with the maximum quantity of dust-laden air to be drawn from said finite space, said apparatus comprising a plurality of separate individual dust extractors, with each of said individual extractors having its own individual filter means, its own individual blower means and individual drive means for independently individually actuating each of said blower means, said dust extractors each including means for enabling each of said dust extractors individually to receive dust-laden air from any part of said finite space, said individual blower means and said individual drive means being operable to selectively individually terminate receipt of dust-laden air by said individual extractors thereby to enable the overall dust removal capacity of said apparatus to be controlled by selective actuation of said blower means and said drive means to adapt said apparatus to changes in the dust removal capacity necessary for said finite space.

2. Apparatus as claimed in claim 1, wherein each of said extractors is constructed to have a pressure loss therethrough not exceeding about 20 mbar.

3. Apparatus as claimed in claim 1, wherein each of said dust extractors includes a cleaning system for cleaning the filter means therein.

4. Apparatus as claimed in claim 1, further comprising a dust bunker and piping network means communicating said extractors with said bunker.

5. Apparatus according to claim 1, wherein each of said individual dust extractors is disposed in the vicinity of one of said dust emitters.

6. Apparatus according to claim 1, wherein each of said dust extractors includes dry filters therein and wherein said dry filters comprise bag filters.

* * * * *